(12) United States Patent
Dinh

(10) Patent No.: US 6,903,272 B2
(45) Date of Patent: Jun. 7, 2005

(54) GANGABLE ELECTRICAL BOX

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 21 days.

(21) Appl. No.: 10/702,183

(22) Filed: Nov. 5, 2003

(65) Prior Publication Data
US 2005/0092509 A1 May 5, 2005

(51) Int. Cl.⁷ ................................................ H01R 4/00
(52) U.S. Cl. ............................ 174/58; 174/54; 174/61; 174/63; 220/3.2; 248/906
(58) Field of Search .............................. 174/58, 50, 54, 174/61, 63; 248/906, 343; 220/3.2, 3.8, 3.9, 4.02; 439/535

(56) References Cited

U.S. PATENT DOCUMENTS

| | | |
|---|---|---|
| 926,246 A | 6/1909 | Dorff |
| 933,661 A | 9/1909 | Paiste |
| 948,438 A | 2/1910 | Ziegler et al. |
| 1,066,215 A | 7/1913 | Murray |
| 1,104,930 A | 7/1914 | Raquette |
| 1,112,426 A | 9/1914 | Stoddard |
| 1,086,373 A | 10/1914 | Schmitt |
| 1,133,946 A | 3/1915 | Farrell |
| 1,167,879 A | 1/1916 | Bayless et al. |
| 1,201,003 A | 10/1916 | Van Duzer |
| 1,205,589 A | 11/1916 | Young |
| 1,208,393 A | 12/1916 | Smart |
| 1,230,218 A | 6/1917 | Raquette |
| 1,249,313 A | 12/1917 | Boyton et al. |
| 1,444,842 A | 2/1923 | Lagerblade |
| 1,456,385 A | 5/1923 | Kvarnstrom |
| 1,483,453 A | 2/1924 | Knoderer |
| 1,531,309 A | 3/1925 | Ryden |
| 1,534,723 A | 4/1925 | Lewis |
| 1,817,307 A | 8/1931 | Haase et al. |
| 1,857,787 A | 5/1932 | Meeks et al. |
| 2,552,400 A | 5/1951 | Brunia .......................... 220/4 |
| 2,959,633 A | 11/1960 | Palmer et al. ................ 174/50 |
| 3,564,112 A | 2/1971 | Algotsson et al. ............ 174/52 |
| 3,584,135 A | 6/1971 | Dowtin ........................ 174/50 |
| 3,622,029 A | 11/1971 | Ware .......................... 220/3.7 |
| 4,057,164 A | 11/1977 | Maier ......................... 220/3.6 |
| 4,111,328 A | 9/1978 | Eggert et al. .................. 220/4 |
| 4,263,472 A | 4/1981 | Mahen ........................ 174/51 |
| 4,428,492 A | 1/1984 | Jorgensen ................. 220/3.94 |
| 5,159,155 A | 10/1992 | Nishihara .................... 174/50 |

(Continued)

FOREIGN PATENT DOCUMENTS

| | | |
|---|---|---|
| DE | 2033990 | 7/1970 |

Primary Examiner—Dhiru R. Patel
(74) Attorney, Agent, or Firm—G. Andrew Barger

(57) ABSTRACT

An electrical box is provided that is easily adaptable for ganging to an adjacent electrical box. The electrical box includes a body member having a pair of opposed side walls, a rear wall contiguously formed between the pair of opposed side walls, a pair of opposed guides bounding the body member and integrally formed therewith, and a pair of opposed tabs disposed between the pair of opposed side walls and integrally formed on the pair of opposed guides. A pair of opposed retention members disposed on the side wall that each have adjacent longitudinal slots for slidingly receiving one of the pair of opposed guides within one of the adjacent longitudinal slots when the side wall is inserted into the body member, a pair of opposed flanges integrally formed with the pair of opposed retention members and having an aperture disposed therein, a pair of opposed stop members integrally formed with the pair of opposed retention members for adding rigidity to the side wall when inserted into the body member and for abutting one of the pair of opposed guides of the body member.

20 Claims, 8 Drawing Sheets

U.S. PATENT DOCUMENTS

| | | | |
|---|---|---|---|
| 5,239,129 A | 8/1993 | Ehrenfels | 174/51 |
| 5,378,854 A | 1/1995 | Hoover | 174/53 |
| 5,574,255 A | 11/1996 | Simmons | 174/53 |
| 5,594,207 A | 1/1997 | Fabian et al. | 174/58 |
| 6,066,802 A | 5/2000 | Reinke et al. | 174/50 |
| 6,066,803 A | 5/2000 | Hagarty | 174/50 |
| 6,107,567 A | 8/2000 | Blalock | 174/58 |
| 6,147,304 A * | 11/2000 | Doherty | 174/48 |
| 6,198,045 B1 * | 3/2001 | Roesch | 174/58 |
| 6,229,087 B1 | 5/2001 | Archer | 174/50 |
| 6,376,770 B1 * | 4/2002 | Hyde | 174/58 |
| 6,384,334 B1 * | 5/2002 | Webb | 174/58 |
| 6,573,449 B2 * | 6/2003 | Vrame | 174/58 |
| 6,710,245 B2 * | 3/2004 | Roesch et al. | 174/50 |
| 6,727,428 B2 * | 4/2004 | Archer et al. | 174/50 |
| 6,750,398 B1 * | 6/2004 | Richardson | 174/58 |
| 6,753,471 B2 * | 6/2004 | Johnson et al. | 174/50 |

\* cited by examiner

GANGABLE ELECTRICAL BOX

FIELD OF THE INVENTION

The present invention relates generally to electrical boxes for installing switches, plugs and accessories within a wall such that they are accessible from outside the wall, and more particularly to laterally ganging such electrical boxes.

BACKGROUND

It is common to make electrical boxes in differing sizes to accommodate varying numbers and sizes of electrical components, such as electrical outlets, switches, etc that are installed in the electrical boxes. This multiplicity of sizes creates manufacturing and inventory problems for the fabricator, distributors, retailers and buildings. Gangable electrical boxes have been created to couple a plurality of electrical boxes together to accommodate a growing number of electrical components that must be placed adjacent to each other in the wall.

Electrical boxes are typically secured to a building's wall stud by means of a nail or screw attachment that is incorporated in the electrical box design. Present electrical boxes have a nail attachment device so that the box can be mounted to the side face of the wall stud or a screw attachment device so that the box can be mounted to the front face of the stud, but such boxes do not enable both types of installations.

What has also been described in existing gangable electrical boxes is an electrical box with a frangible side wall that can be removed when an adjacent electrical box is ganged to the electrical box thereby providing for lateral access between the interiors of the ganged boxes. A drawback to such an electrical box is that the entire side wall is removed thereby leaving the ganged boxes without extra structural support for rigidity and without extra structural support to prevent twisting of the ganged boxes when the electrical components are installed.

In addition, present electrical boxes are not truly hermaphroditic to provide for ease of installation and insertion and removal of side walls, such as that shown and described in U.S. Pat. No. 5,574,255 and U.S. Pat. No. 5,574,255 C1, each entitled "Laterally Expandable Modular Electrical Box."

Typically, in new construction, contractors must order a multitude of differently sized electrical boxes to be able to select the required size as needed. Likewise, fabricators, distributors and retailers must be able to supply all of the sizes that may be required in any particular construction project. This results in complexity in the part ordering and installation process, while requiring manufacturers to track and produce a number of parts and the associated catalogue numbers or stock keeping units.

Accordingly, it is desirable to have a single electrical box configuration that is easily gangable, hermaphroditic, that maintains full structural integrity when a frangible portion of a separating wall is removed, that has added rigidity and robustness, and has a minimum of stock keeping units.

SUMMARY OF THE INVENTION

The present invention eliminates the above difficulties and disadvantages by providing an electrical box is provided that is easily adaptable for ganging to an adjacent electrical box. Only two part identifiers or stock keeping units have to be ordered by the purchaser of the present electrical box: a body member and a hermaphroditic side wall that is doubled to provide the two side walls for the box. In particular, the electrical box includes a body member having a pair of opposed side walls, a rear wall contiguously formed between the pair of opposed side walls, a pair of opposed guides bounding the body member and integrally formed therewith, which are orthogonal to the side walls for added rigidity, and a pair of opposed tabs disposed between the pair of opposed side walls and integrally formed on the pair of opposed guides. A nail guide is formed on each of the side walls for nailing the electrical box to a side face of the wall stud.

First and second hermaphroditic side walls are provided in the electrical box and each include a detachably coupled portion for permitting lateral access between the electrical box and the adjacent electrical box when the detachably coupled portion is removed and the electrical box is ganged to the adjacent electrical box. The detachably coupled portions are disposed longitudinally away from the rear wall of the body member so that rigidity is maintained and twisting of the electrical box when the detachably coupled portions are removed from the first and second side walls. A pair of opposed retention members are disposed on the side wall such that each have inner and outer adjacent longitudinal slots for slidingly receiving one of the pair of opposed guides within one of the adjacent longitudinal slots when the side wall is inserted into the body member of the electrical box and the adjacent electrical box. A pair of opposed flanges are integrally formed with the pair of opposed retention members and have an aperture disposed therein for insertion of a screw or nail so that the electrical box can be secured to a front face of the wall stud. A pair of opposed stop members are integrally formed with the pair of opposed retention members for adding rigidity to the side wall when inserted into the body member and for abutting one of the pair of opposed guides of the body member. The pair of opposed stop members further prevent longitudinal movement of the first and second side walls toward the rear wall of the body member when the first and second side walls are inserted into the body member. In addition, a pair of laterally spaced brackets are disposed on at least one side of the side wall for abutting one of the opposed guides of the body member and for adding rigidity to the side wall when inserted into the body member. A coupling aperture is also disposed in the side wall for receiving one of the pair of opposed tabs therein when the side wall is inserted into the body member such that the side wall is releasably secured to the body member.

DETAILED DESCRIPTION OF THE PREFERRED EMBODIMENT(S)

Figure 1:
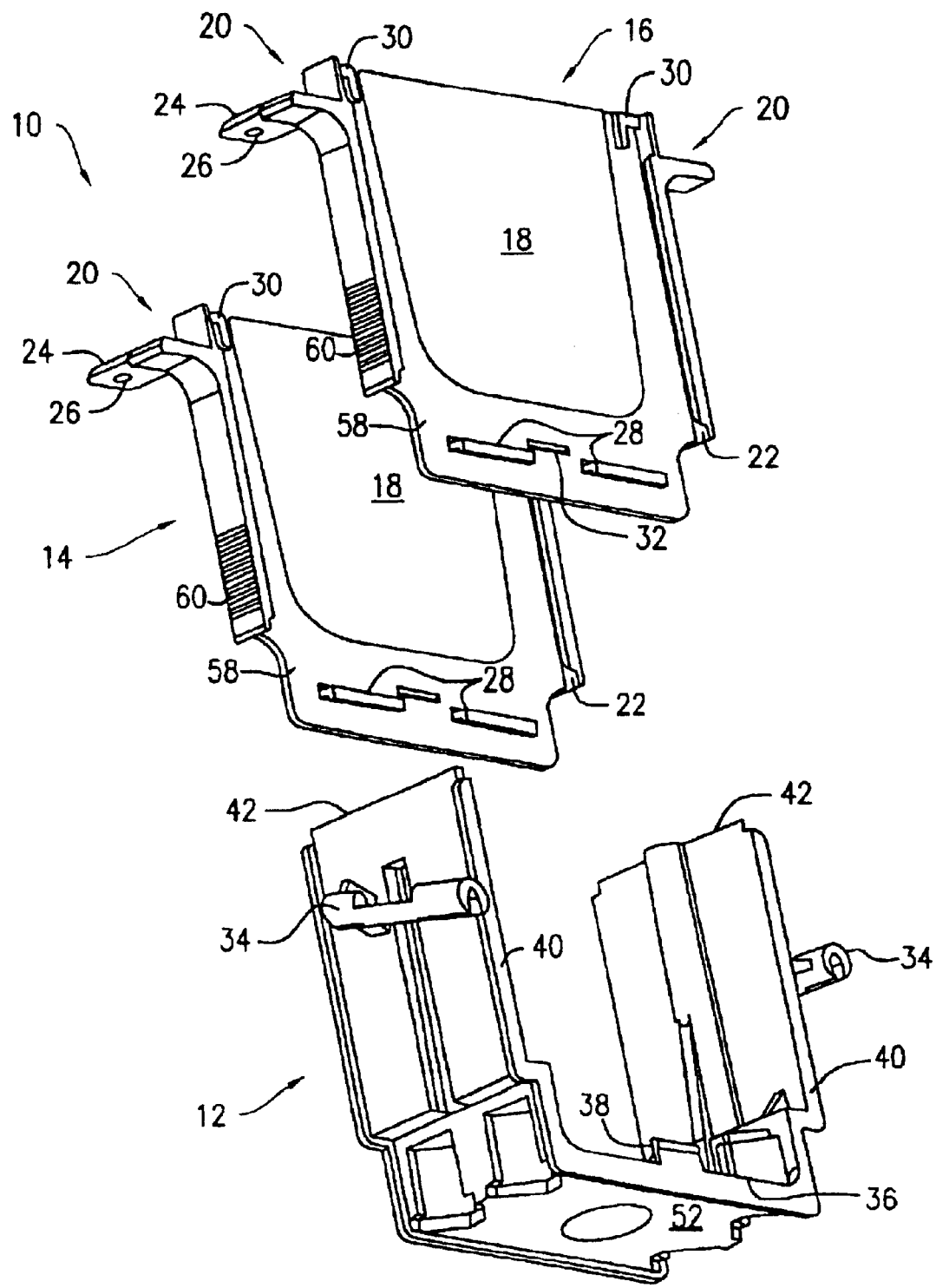
FIG. 1 is an exploded perspective view of an electrical box of the present invention.

The above and other features, aspects, and advantages of the present invention will now be discussed in the following detailed description and appended claims, which are to be considered in conjunction with the accompanying drawings in which identical reference characters designate like elements throughout the views.

Figure 6:
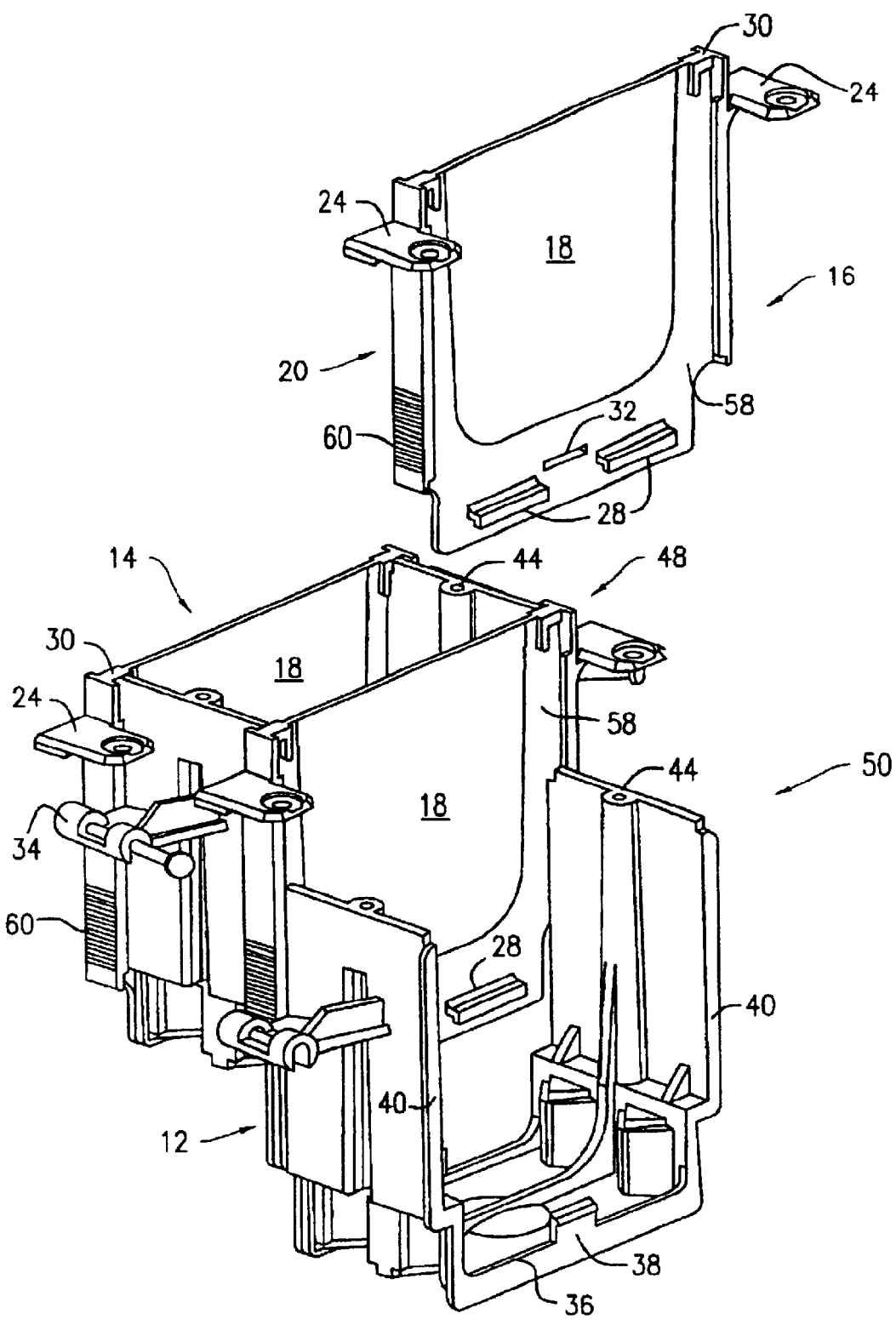
FIG. 6 is a partially exploded view of the electrical box of the present invention ganged to an adjacent electrical box.
Figure 7:
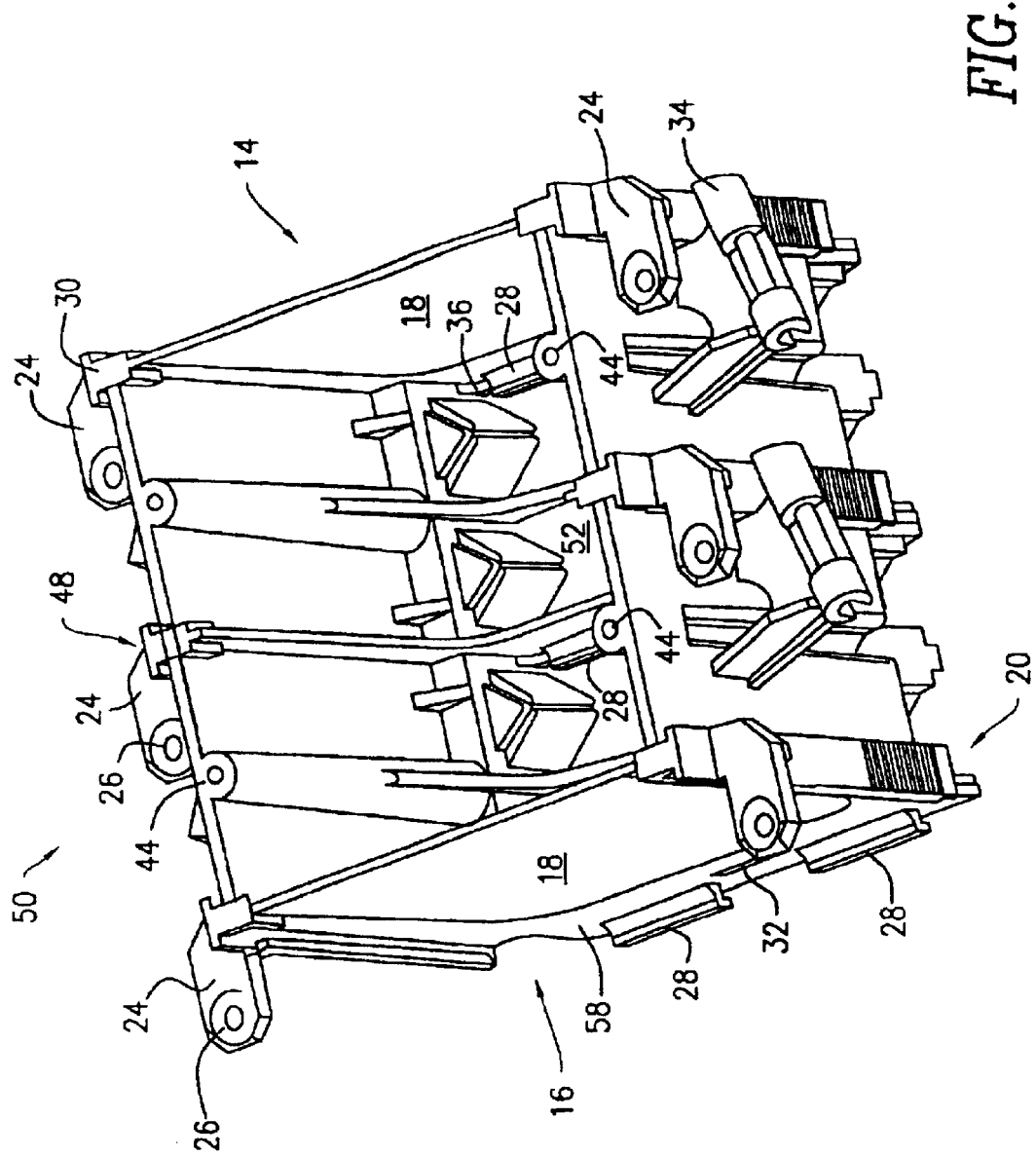
FIG. 7 is a partially exploded view of the electrical box of the present invention ganged to the adjacent electrical box.
Figure 8:
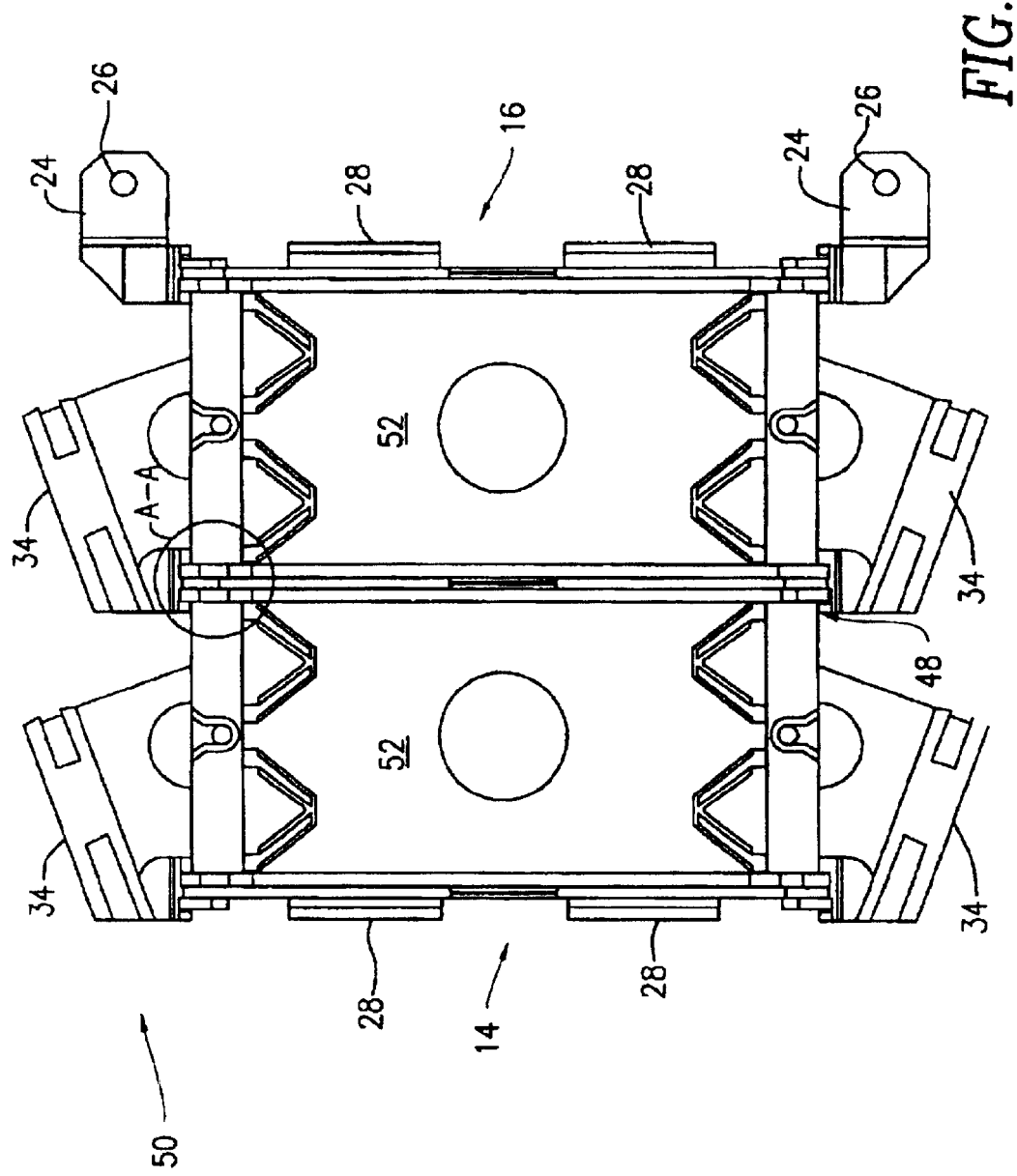
FIG. 8 is a bottom plan view of the electrical box of the present invention ganged to the adjacent electrical box.

Shown in FIG. 1 is an electrical box 10 for receiving a first set of wires therein and that is adaptable for securing to an adjacent electrical box 50, as shown in FIGS. 6–8, and that will be discussed in greater detail below. The electrical box 10 and adjacent electrical box 50 are preferably constructed of nylon, but could be constructed of any thermo-plastic that is relatively hard and durable. The construction could also be of metal such as galvanized metal.

The electrical box 10 requires only two part identifiers or SKUs that have to be ordered by the purchaser: a body member 12 and a preferably hermaphroditic first and second side walls, 14, 16 that are identical. Therefore, one SKU is needed for the body member 12 and a second is needed for the identical side walls 14, 16.

Figure 3:
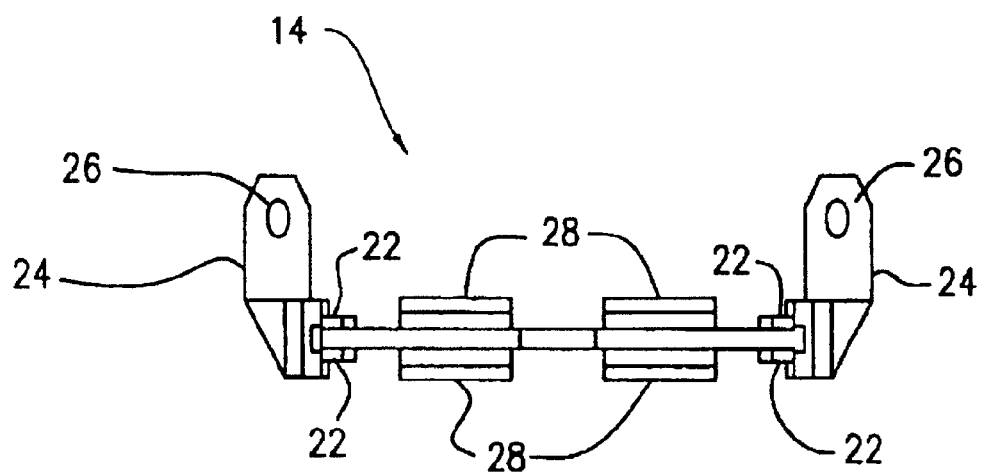
FIG. 3 is a bottom plan view of the electrical box of the present invention.
Figure 4:
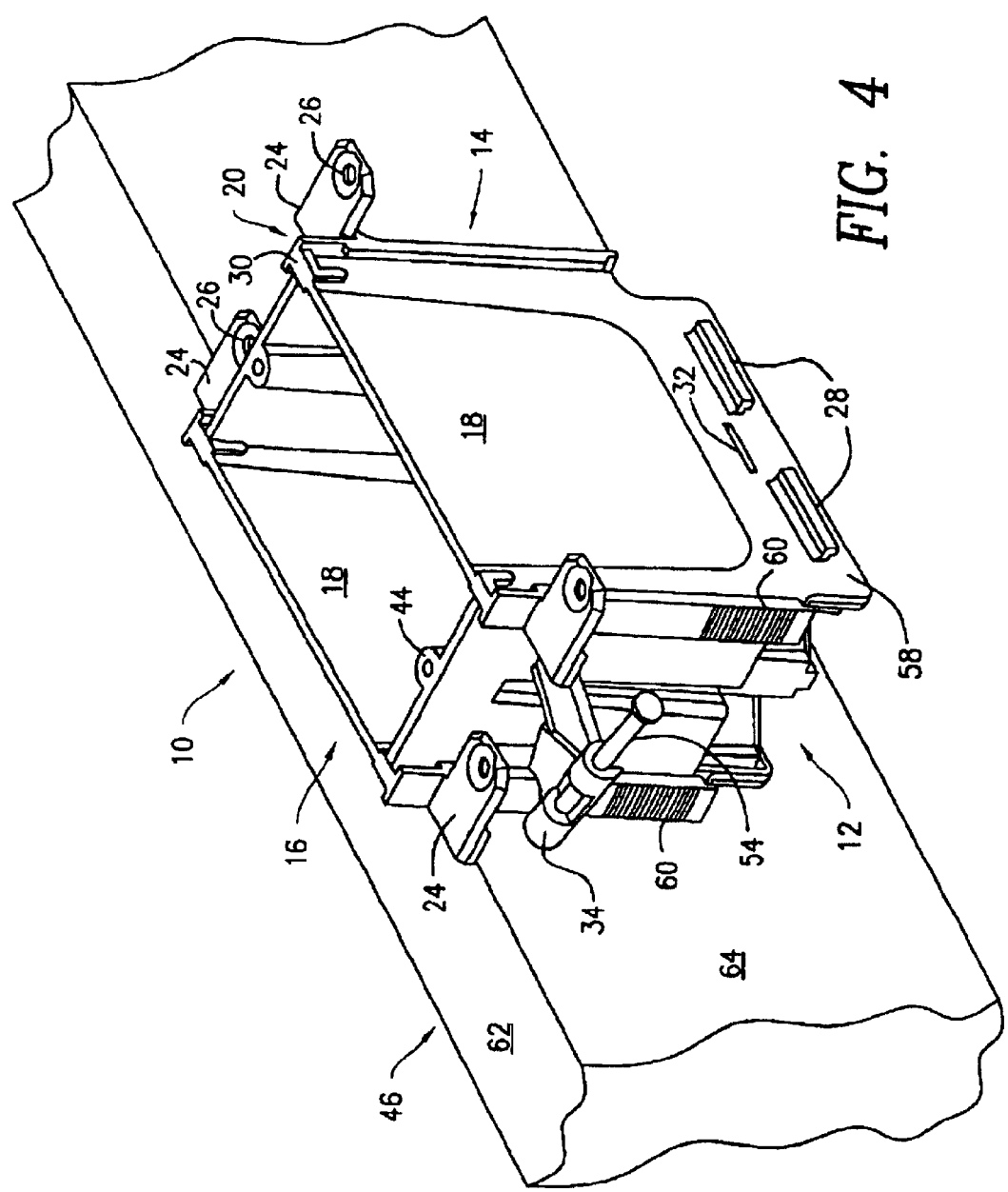
FIG. 4 is a perspective view of the electrical box of the present invention secured to a side face of a wall stud.
Figure 5:
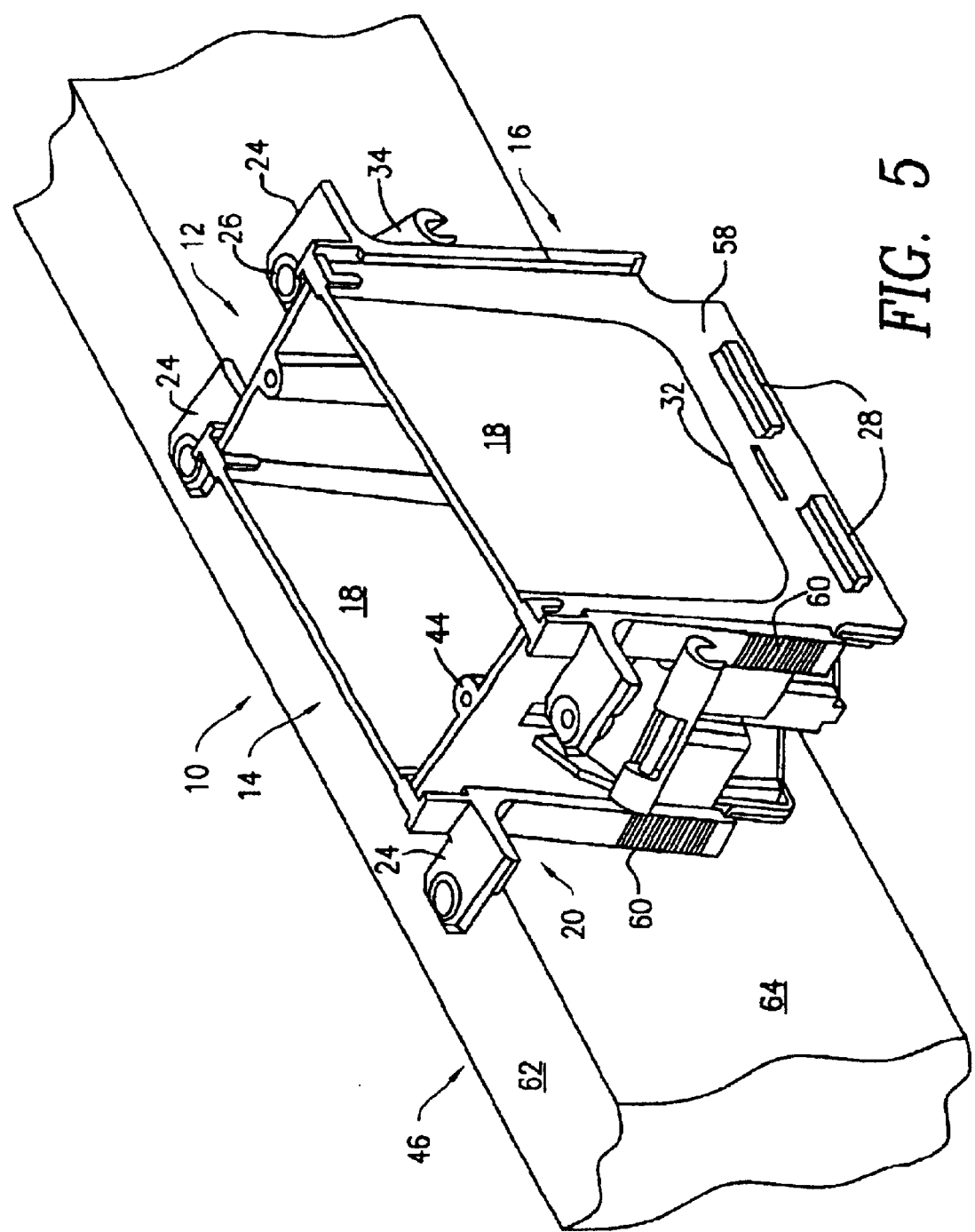
FIG. 5 is a perspective view of the electrical box of the present invention secured to a side face of a wall stud.

Referring again to FIG. 1, the electrical box 10 includes a generally C-shaped body member 12 that has a pair of opposed side walls 42 and a rear wall 52 contiguously formed between the pair of opposed side walls 42. A pair of opposed guides 40 bound the opposing side walls 42 and rear wall 52 of the body member 12 and are integrally formed therewith. The opposed guides 40 are formed orthogonal to the side walls 42 for added rigidity and for coupling the body member 12 to the first and second side walls 14, 16 as will be discussed in greater detail below. A pair of opposed tabs 38, which is best shown in FIG. 3, are disposed between the pair of opposed side walls 42 and each integrally formed on the pair of opposed guides 40 at the portion that bounds the rear wall 52. A nail guide 34 is formed on each of the opposing side walls 42 for nailing the electrical box 10 to a side face 64 of a wall stud 46 as shown in FIG. 4 and which will be discussed in greater detail below.

As is further shown in FIG. 1, first and second side walls 14, 16 are provided in the electrical box 10 and are preferably hermaphroditic. Each of the first and second side walls 14, 16 include a detachably coupled portion 18. The detachably coupled portions 18 are disposed longitudinally away from the rear wall 52 of the body member 12, as shown in FIGS. 4–7. When the electrical box 10 and the adjacent electrical box 52 are ganged as shown in FIGS. 6 and 7, the second side wall 16, if the electrical box 10 is being mounted to the side face 64 of the wall stud 46 or the first side wall 14 if the electrical box 10 is being mounted to the front face 62 of the wall stud 46, the detachably coupled portion 18 may be left intact to physically and electrically separate a high voltage component such as an electrical plug from a low voltage component such as a telephone jack. Alternatively, the detachably coupled portions 18 may be removed for permitting lateral access between the electrical box 10 and the adjacent electrical box 50.

A further advantage in the present invention is a bounding edge 58 that is formed around and defines the detachably coupled portions 18. When the detachably coupled portions 18 are removed, the bounding edge 58 of the first and second side walls 14, 16 remains installed in the body member 12 so that rigidity is maintained and twisting of the electrical box is prevented when the detachably coupled portions 18 are removed from either the first or second side walls 14, 16. In addition, the bounding edge 58 of each of the first and second side walls 14, 16 each abut one of the opposing guides 40 such that a double edge thickness is created between the side walls 14, 16 and the body member 12 for added rigidity and robustness of the electrical box 10.

Figure 2:
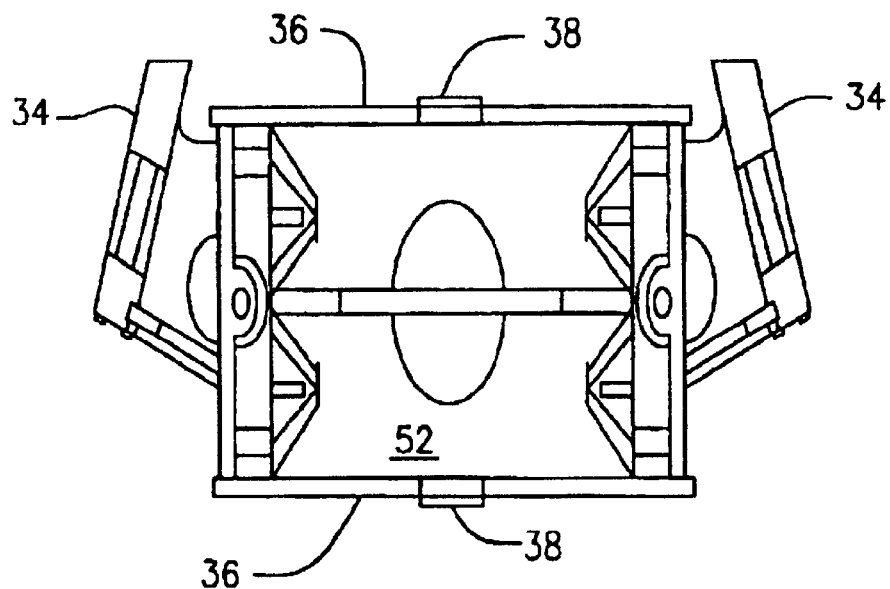
FIG. 2 is a bottom plan view of a first or second side wall of the electrical box of the present invention.

In addition and as shown in FIGS. 1, 2 and 7, a pair of laterally spaced brackets 28 are disposed on at least one side of the side walls 14, 16, but preferably on both the first and second side walls 14, 16 for abutting the abutment edge 36 of the opposed guides 40 adjacent to the rear wall 52 of the body member 12. The pair of laterally spaced brackets 28 are preferably L-shaped and when they are seated on the abutment edge 36 of the opposed guides 40, the brackets 28 add rigidity to the particular first or second side walls 14, 16 when inserted into the body member 12. The pair of laterally spaced brackets 28 also prevent side-to-side bending of the first and second side walls 14, 16 and twisting of the first and second side walls 14, 16, which is especially applicable when the detachably coupled portions 18 are being separated from the bounding edge 58.

A pair of opposed tabs 38 are integrally formed on the bounding edge 38 and the portion of the opposing guides 40 that is formed with the rear wall 52. On each of the first and second side walls 14, 16 a coupling aperture 32, as shown in FIGS. 1, 4–7, is also disposed in the first and second side walls 14, 16 for receiving one of the pair of opposed tabs 38 therein when one of the first or second side walls 14, 16 is inserted into the body member 12 such that the first or second side walls 14, 16 is releasably secured to the body member 12. Once secured in the coupling apertures 32, as shown in FIG. 3, an installer can use a tool such as a flat head screwdriver to press the tab 38 toward the body member 12.

Figure 9:
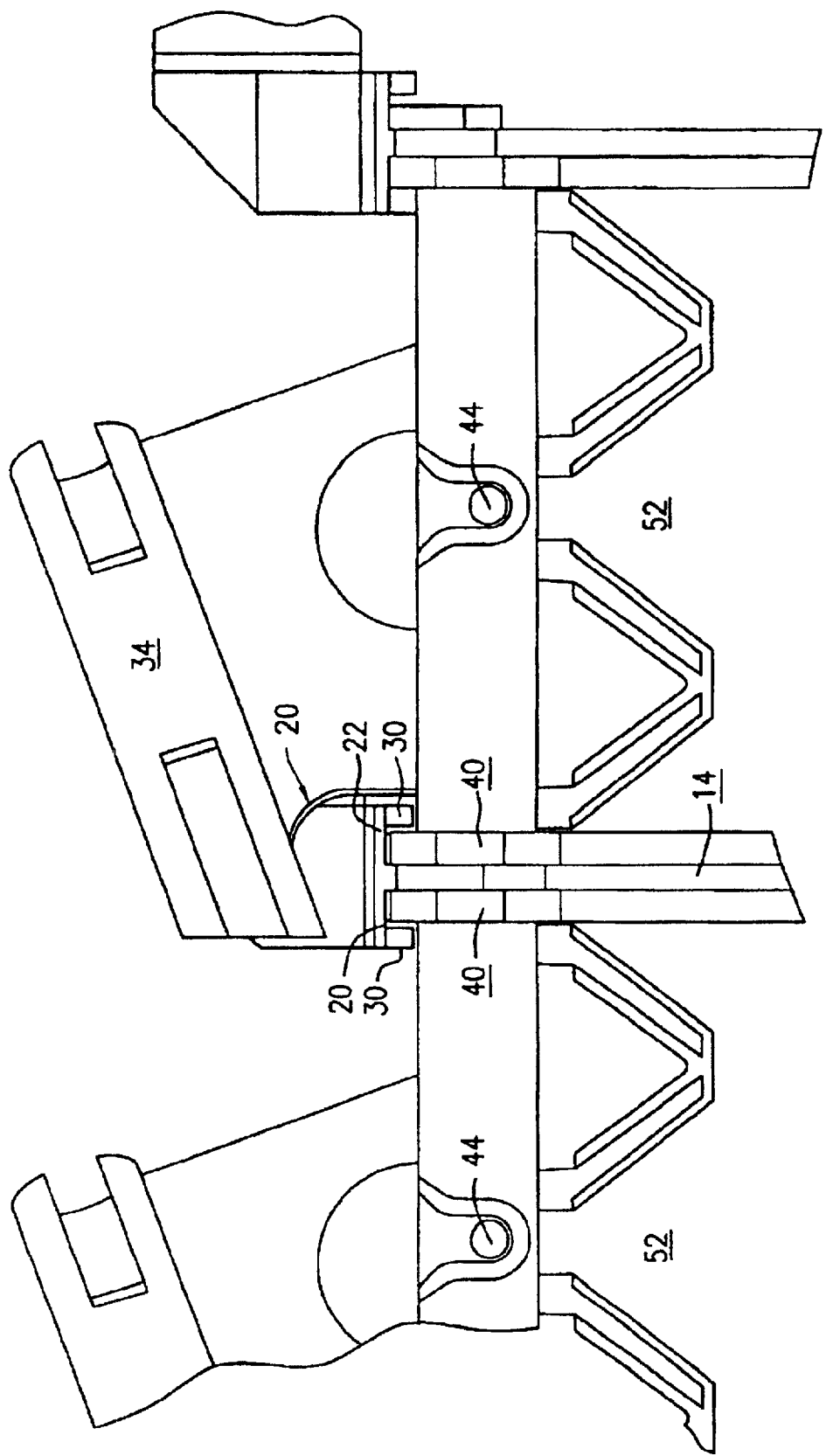
FIG. 9 is a detailed view of a retention member along detail A—A having a guide from the electrical box disposed in an inner slot and a guide from the adjacent electrical box disposed in the outer slot.

A pair of opposed retention members 20 are disposed on the first and second side walls 14, 16. As shown in FIGS. 1 and 9, each has inner and outer adjacent longitudinal slots 22 for slidingly receiving one of the pair of opposed guides 40 within one of the adjacent longitudinal slots 22, and preferably the inner slot 22, when the first side wall 14 or the second side 16 is inserted into the body member 12 of the electrical box 10. Detail A—A of FIG. 8 is shown in FIG. 8 such that when the adjacent electrical box 50 is ganged to the electrical box 10, an opposed guide 40 from the electrical box 10 is disposed in the inner slot 22 of the opposing retention members 20 and a guide 40 from the adjacent and identical electrical box 50 is disposed in the outer slot 22 of the opposing retention members 20.

A first and a second pair of opposed flanges 24 are integrally formed with the pair of opposed retention members 20 on each of the first and second side walls 14, 16 and preferably each have an aperture 26 disposed therein for insertion of a screw or nail. As mentioned above, nail guides 34 are formed on each of the side walls 14, 16 for nailing the electrical box to the side face 64 of the wall stud 46 as shown in FIG. 4. Thus, the electrical box 10 is secured to the front face 62 of the wall stud 46 via the first pair of opposed flanges 24 when the first side wall 14 abuts the side face 64 of the wall stud 46 and is secured to the side face 64 of the wall stud 46 via at least one of the pair of opposed nail guides 34 when the second side wall 16 abuts the side face 64 of the wall stud 46.

A pair of opposed stop members 30 are integrally formed with the pair of opposed retention members 20 on each of the first and second side walls 14, 16 for adding rigidity thereto when inserted into the body member 12. Moreover, the pair of opposed stop members 30 abut one of the pair of opposed guides 40 of the body member 12. The pair of opposed stop members 30 further prevent longitudinal movement of the first and second side walls 14, 16 toward the rear wall 52 of the body member 12 when the first and second side walls 14, 16 are inserted into the body member 12. Furthermore, the pair of opposed stop members 30 form a ninety degree angle and prevent twisting of the opposing guides 40 when disposed in the inner and outer slots 22 of the retention members 20.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above description is to be considered exemplary, rather than limiting, and the true scope of the invention is that defined in the following claims.

What is claimed is:

1. An electrical box for securing to a wall stud and adaptable for ganging to an adjacent electrical box, the electrical box comprising:
   a body member including:
      a pair of opposed side walls;
      a rear wall contiguously formed between the pair of opposed side walls; and
   a first side wall releasably secured to the body member and including:
      a first bounding edge;
      a first detachably coupled portion attached to the first bounding edge; and
   a second side wall releasably secured to the body member and including:
      a second bounding edge;
      a second detachably coupled portion attached to the second bounding edge; and
   wherein the first and second detachably coupled portions are longitudinally disposed from the rear wall of the body member such that when the first and second detachably coupled portions are removed from the electrical box the first and second bounding edges of the first and second detachably coupled portions, respectively, remain secured to the body member thereby providing rigidity to the body member.

2. The electrical box of claim 1 wherein the first and second side walls are hermaphroditic.

3. The electrical box of claim 1 wherein the first and second side walls are identical for ease of installation into the body member.

4. The electrical box of claim 1 wherein the body member further comprises a pair of opposed guides bounding the body member and orthogonal to the pair of opposed side walls such that rigidity is added to the electrical box.

5. The electrical boxed of claim 4 wherein the body member further comprises a pair of opposed tabs disposed between the pair of opposed side walls and integrally formed on the pair of opposed guides.

6. The electrical box of claim 5 wherein the first and second walls further comprise a first and second coupling aperture, respectively, for each receiving one of the pair of opposed tabs therein for releasably securing the first and second side walls to the body member.

7. The electrical box of claim 4 further comprising an abutment edge on at least one of the pair of opposed guides that is located adjacent to the rear wall.

8. The electrical box of claim 7 further comprising a pair of laterally-spaced brackets disposed on the first and second side walls for contacting the abutment edge on at least one of the pair of opposed guides.

9. The electrical box of claim 4 further comprising an opposed stop member disposed on each of the first and second side walls for abutting the pair of opposed guides bounding the body member and for preventing longitudinal movement of the first and second side walls toward the rear wall of the body member when the first and second walls are inserted into the body member, and for resisting twisting of the first and second side walls when the first and second detachably coupled portions are removed from the first and second side walls, respectively.

10. An electrical box for securing to a wall stud having a front face and a side face, the electrical box adaptable for ganging to an adjacent electrical box, the electrical box comprising:
    a body member including: a pair of opposed side walls, a rear wall contiguously formed between the pair of opposed side walls, a pair of opposed nail guides affixed to the pair of opposed side walls; and a first side wall releasably secured to the body member and including: a first pair of opposed flanges extending away from the first side wall and beyond the plane of the first side wall; and a second side wall releasably secured to the body member; and such that the electrical box is secured to the front face of the wall stud via at least one of the first pair of opposed flanges when the first side walls abuts the side face of the wall stud and wherein the electrical box is secured to the side face of the wall stud via at least one of the pair of opposed nail guides when the second side wall abuts the side face of the wall stud.

11. The electrical box of claim 10 wherein the first and second side walls are hermaphroditic.

12. The electrical box of claim 10 wherein the first and second side walls are identical for ease of installation into the body member.

13. The electrical box of claim 10 wherein the body member further comprises a pair of opposed guides bounding the body member and orthogonal to the pair of opposed side walls such that rigidity is added to the electrical box.

14. The electrical box of claim 13 wherein the body member further comprises a pair of opposed tabs disposed between the pair of opposed side walls and integrally formed on the pair of opposed guides.

15. The electrical box of claim 14 wherein the first and second walls further comprise a first and second coupling aperture, respectively, for each receiving one of the pair of opposed tabs therein for releasably securing the first and second side walls to the body member.

16. An electrical box for securing to a wall stud and adaptable for ganging to an adjacent electrical box having an adjacent body member, the electrical box comprising:
    a body member including:
       a pair of opposed side walls;
       a rear wall contiguously formed between the pair of opposed side walls; and
    a first side wall releasably secured to the body member and including:
       a first bounding edge;
       a first pair of opposed retention members disposed on the first side wall and having an inner longitudinal slot and an outer longitudinal slot adjacent to the inner longitudinal slot, the inner longitudinal slot adaptable for slidingly receiving part of the body member of the electrical box therein when the first side wall is inserted into the body member of the electrical box and the outer longitudinal slot adaptable for slidingly receiving part of the adjacent body member of the adjacent electrical box therein when the adjacent body member of the adjacent electrical box is inserted into the first side wall; and a second side wall releasably secured to the body member and including:
  a second bounding edge,
  a second pair of opposed retention members disposed on the second side wall and having an inner longitudinal slot and an outer longitudinal slot adjacent to the inner longitudinal slot, the inner longitudinal slot adaptable for slidingly receiving part of the body member of the electrical box therein when the second side wall is inserted into the body member of the electrical box and the outer longitudinal slot adaptable for slidingly receiving part of the adjacent body member of the adjacent electrical box therein when the adjacent body member of the adjacent electrical box is inserted into the second side wall.

17. The electrical box of claim 16 wherein the first side wall further comprises a first detachably coupled portion releasably attached to the first bounding edge.

18. The electrical box of claim 17 wherein the second side wall further comprises a second detachably coupled portion releasably attached to the second bounding edge.

19. The electrical box of claim 18 wherein the first and second detachably coupled portions are longitudinally disposed from the rear wall of the body member such that when the first and second detachably coupled portions are removed from the electrical box the first and second bounding edges of the first and second detachably coupled portions, respectively, remain secured to the body member thereby providing rigidity to the body member.

20. The electrical box of claim 18 further comprising an opposed stop member disposed on each of the first and second side walls for abutting the pair of opposed guides bounding the body member and for preventing longitudinal movement of the first and second side walls toward the rear wall of the body member when the first and second walls are inserted into the body member, and for resisting twisting of the first and second side walls when the first and second detachably coupled portions are removed from the first and second side walls, respectively.

* * * * *